Patented Jan. 13, 1953

2,625,572

UNITED STATES PATENT OFFICE 2,625,572

VULCANIZATION OF RUBBER

Bernard C. Barton, Clifton, N. J., assignor to United States Rubber Company, New York, N. Y., a corporation of New Jersey No Drawing. Application May 2, 1950, Serial No. 159,666

6 Claims. (Cl. 260—793)

This invention relates to improvements in the method of curing rubber, i. e. Hevea rubber and similar vulcanizable gums, and particularly to a method of making soft-vulcanized rubber which does not require the presence of zinc oxide or equivalent combined-metal activator of vulcanization.

This application is a continuation-in-part of my application, Serial No. 38,560, filed July 13, 1948, now Patent No. 2,546,083, and assigned to the same assignee as the instant application.

More particularly, this invention relates to a method of vulcanizing rubber in the presence of a novel vulcanizing combination comprising (A) a p-quinonebisarylimine, (B) a relatively small amount of sulfur, and (C) an accelerator of vulcanization comprising a metal dialkyl dithiocarbamate. The vulcanization proceeds in the absence of metal oxides or metal soaps or other combined metal activators such as metal carbonates. An organic amine increases the speed of cure and improves the physical properties of cured stock, but is not essential to my invention.

I am aware that vulcanization without zinc oxide was not uncommon to the rubber technologist before the advent of organic accelerators. Relatively large amounts of sulfur were necessary for desirable physical properties when zinc oxide was not used, and poor aging was an accepted characteristic of the vulcanizates.

With the development of modern accelerators the use of zinc oxide, together with lowered sulfur concentration, became the universal practice for making soft-vulcanized rubber and resulted in great improvements in the aging characteristics of the rubber products. However, certain disadvantages to the use of zinc oxide are known. For example, the stability of latices is greatly reduced by the presence of zinc oxide. Furthermore, the use of zinc oxide leads to prevulcanization and mill scorching of dry rubber compounds containing many of the commercial accelerators, such as metal dialkyl dithiocarbamates.

The principal object of the present invention is to provide new vulcanizable compositions which can be vulcanized without using zinc oxide or equivalent combined metal activators of vulcanization, which activators have heretofore been an essential ingredient in conventional low-sulfur vulcanizable compositions.

According to the present invention, it has been found that the necessity for employing zinc oxide or similar activators in low-sulfur formulations accelerated with a metal dialkyl dithiocarbamate can be eliminated by employing a vulcanizing combination comprising a p-quinone-bisarylimine, a small amount of sulfur, and a metal dialkyl dithiocarbamate accelerator, e. g., zinc dimethyl dithiocarbamate, cupric diethyl dithiocarbamate, lead dimethyl dithiocarbamate, etc. The p-quinonebisarylimine may be, for example, p-quinonebisphenylimine, p-quinonebis-o-tolylimine, p-quinonebis-p-tolylimine, p-quinonebis-alpha-naphthylimine, and p-quinonebis-beta-naphthylimine. The alkyl group of the metal dialkyl dithiocarbamate may also be, e. g., propyl, butyl, amyl, octyl, etc. The accelerator brings about the combination of sulfur which is the initial step of the vulcanization reaction. A particularly good acceleration of the vulcanization process of my invention is obtained by using both a metal dialkyl dithiocarbamate and an organic amine.

An illustrative formula for vulcanizing rubber in the absence of zinc oxide in the manner of this invention is shown in Table I, below, in which Formula B represents the improved composition of my invention, and Formula A represents a similar composition with the sulfur omitted. Portions of the stocks were heated for various times at 100° C. The extent of cure was indicated by stress at 200% elongation as shown in the table.

Table I

|  | A | B |
|---|---|---|
| Parts by Weight: |  |  |
| Rubber | 100 | 100 |
| Zinc dimethyldithiocarbamate | 2 | 2 |
| Dibenzylamine | 1 | 1 |
| Sulfur | 0 | 1 |
| p-Quinonebisphenylimine | 7.8 | 7.8 |
| Stress at 200% Elongation: |  |  |
| Cured 2 hours at 100° C | 35 | 210 |
| Cured 4 hours at 100° C | 65 | 240 |
| Cured 16 hours at 100° C | 100 | 250 |

In Formula A, in which the sulfur was omitted, there was virtually no cure.

Another series of cures was run in which the amount of p-quinonebisarylimine was varied, as shown in Table II. Formulas D, F, and H represent the invention, and Formulas C, E and G are controls without sulfur—

Table II

|  | C | D | E | F | G | H |
|---|---|---|---|---|---|---|
| Parts by Weight: |  |  |  |  |  |  |
| Rubber | 100 | 100 | 100 | 100 | 100 | 100 |
| Zinc dimethyl dithiocarbamate | 2 | 2 | 2 | 2 | 2 | 2 |
| Dibenzylamine | 1 | 1 | 1 | 1 | 1 | 1 |
| Sulfur | 0 | 1 | 0 | 1 | 0 | 1 |
| p-Quinonebisphenylimine | 2 | 2 | 4 | 4 | 8 | 8 |
| Stress at 200% elongation: Cured 16 hours at 100° C | 35 | 80 | 80 | 140 | 100 | 230 |

It is evident from the data that the sulfur and the dithiocarbamate accelerator in combination with the p-quinone bisarylimine display highly effective vulcanizing action. It should be noted that the amount of sulfur employed in these experiments is relatively small, compared to the amount which would be used in conventional formulations for an equivalent cure.

The quantity of p-quinonebisarylimine employed as vulcanizing agent in my invention may vary from about 2 to 15 parts per 100 parts of rubber, although it is preferred to employ about 5 to 10 parts. The higher the quantity of sulfur employed, the smaller the amount of p-quinonebisarylimine required for an equivalent cure to a soft-vulcanized product.

The amount of sulfur which I employ is quite small, i. e., from 0.25 to only 2 parts per 100 parts of rubber. Conventional zinc oxide activated formulations require larger amounts of sulfur, e. g., 1 to 5 parts for an equivalent cure. While it is not desired to limit the invention to any particular theory of operation, I believe that the difference in sulfur requirements between my process and conventional processes may be explained by considering present theories of the vulcanization of rubber. According to such theories, rubber and sulfur react to form rubber-sulfur addition compounds such as rubber-mercaptans as the initial step of vulcanization. The rubber-mercaptan may then be assumed to react with additional sulfur to form stable intermolecular cross-linkages. During this second reaction, part of the additional sulfur is reduced to sulfide sulfur, that is, the sulfur acts as an oxidizing agent. In my new process, I believe that the p-quinonebisarylimine is capable of performing this second reaction, the assumed oxidation step, thus, taking the place of a large part of the sulfur ordinarily employed in vulcanization. However, unlike the oxidation with sulfur which is assumed to be one step of the ordinary vulcanization process, the oxidation step with the p-quinonebisarylimine which I employ proceeds without the addition of zinc oxide or other combined metal activator formerly considered to be essential. In my process, relatively little vulcanization takes place under ordinary curing conditions unless at least a small amount of sulfur, i. e., 0.25 part per 100 parts of rubber, is present.

Larger quantities of sulfur, e. g., 3 parts or more per 100 parts of rubber may be employed if desired, provided the amount of p-quinonebisarylimine used is small. Over-cure takes place and optimum physical properties are not attained if, in the same formulation, the quantity of sulfur is greater than 2% and the amount of p-quinonebisarylimine is greater than about 5%; i. e., the vulcanizing actions of the sulfur and p-quinonebisarylimine are additive, producing an over-cure if larger than the preferred amounts of both are used together.

The quantity of dithiocarbamate accelerator employed may vary from 0.35 to 5 parts per 100 parts of rubber and is preferably about 0.5 to 2.0 parts per 100 parts of rubber.

The quantity of amine employed is preferably about 0.5 to 1.5 parts per 100 parts of rubber. Larger amounts may be used, e. g., 2 to 4 parts per 100 parts of rubber, but tend to cause reversion of the cure, if employed at higher curing temperatures.

The time and temperature required for vulcanization by my improved process is, in general, of the same order as required for conventional cures, e. g., 15 to 120 minutes at 160 to 130° C., depending on the particular formulation employed. At higher or lower curing temperatures, the time of cure is correspondingly decreased or increased.

Further examples of accelerators which may be employed to increase the rate and degree of cure obtained in my process are cupric diethyl dithiocarbamate and lead dimethyl dithiocarbamate, and similar metal dialkyl dithiocarbamate accelerators which are well known in the art.

Further examples of organic amines which may be used include diamylamine, dioctylamine, tributylamine, etc.

Having thus described my invention, what I claim and desire to protect by Letters Patent is:

1. A composition vulcanizable in the absence of a combined metal activator, comprising by weight 100 parts of rubber, 0.35 to 5 parts of an accelerator from the class consisting of zinc, cupric and lead dialkyl dithiocarbamates, 0.25 to 2 parts of sulfur, and 2 to 15 parts of a p-quinonebisarylimine, said composition being devoid of a combined metal activator.

2. A composition vulcanizable in the absence of a combined metal activator, comprising by weight 100 parts of rubber, 0.35 to 5 parts of zinc dimethyldithiocarbamate as accelerator, 0.25 to 2 parts of sulfur and 2 to 15 parts of p-quinonebisphenylimine, said composition being devoid of a combined metal activator.

3. The process which comprises vulcanizing, in the absence of a combined metal activator, a composition of 100 parts by weight of rubber, 0.35 to 5 parts of an accelerator from the class consisting of zinc, cupric and lead dialkyl dithiocarbamate, 0.25 to 2 parts of sulfur, and 2 to 15 parts of a p-quinonebisarylimine.

4. The process which comprises vulcanizing, in the absence of a combined metal activator, a composition of 100 parts by weight of rubber, 0.35 to 5 parts of zinc dimethyldithiocarbamate as accelerator, 0.25 to 2 parts of sulfur and 2 to 15 parts of p-quinonebisphenylimine.

5. A vulcanized rubber product derived, in the absence of a combined metal activator, from a composition of 100 parts by weight of rubber, 0.35 to 5 parts of an accelerator from the class consisting of zinc, cupric and lead dialkyl dithiocarbamate, 0.25 to 2 parts of sulfur, and 2 to 15 parts of a p-quinonebisarylimine.

6. A vulcanized rubber product derived, in the absence of a combined metal activator, from a composition of 100 parts by weight of rubber, 0.35 to 5 parts of zinc dimethyldithiocarbamate as accelerator, 0.25 to 2 parts of sulfur and 2 to 15 parts of p-quinonebisphenylimine.

BERNARD C. BARTON.

REFERENCES CITED

The following references are of record in the file of this patent:

UNITED STATES PATENTS

| Number | Name | Date |
|---|---|---|
| 1,386,153 | Bruni | Aug. 2, 1921 |
| 2,102,621 | Goodwin | Dec. 21, 1937 |
| 2,170,191 | Fisher | Aug. 22, 1939 |
| 2,183,567 | Howland | Dec. 19, 1939 |